(12) United States Patent
Murayama et al.

(10) Patent No.: US 7,999,434 B2
(45) Date of Patent: Aug. 16, 2011

(54) ELECTROSTATIC ACTUATOR AND POWER GENERATOR

(75) Inventors: Yoshiki Murayama, Hirakata (JP); Naoteru Matsubara, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 12/630,278

(22) Filed: Dec. 3, 2009

(65) Prior Publication Data
US 2010/0079031 A1    Apr. 1, 2010

Related U.S. Application Data (63) Continuation of application No. 12/194,123, filed on Aug. 19, 2008, now Pat. No. 7,649,302.

(30) Foreign Application Priority Data

Aug. 28, 2007 (JP) .................................. 2007-221041

(51) Int. Cl.
  *H02N 1/00*    (2006.01)
(52) U.S. Cl. ......................................................... 310/309
(58) Field of Classification Search .................. 310/309
See application file for complete search history.

(56) References Cited

U.S. PATENT DOCUMENTS

| | | | |
|---|---|---|---|
| 2003/0090172 A1* | 5/2003 | Lee et al. ....................... | 310/309 |
| 2005/0151442 A1* | 7/2005 | Kihara et al. .................. | 310/309 |
| 2005/0212382 A1* | 9/2005 | Odaka et al. ................... | 310/309 |
| 2005/0281420 A1* | 12/2005 | Sekino et al. ................. | 381/191 |
| 2006/0113862 A1* | 6/2006 | Suzuki et al. ................. | 310/309 |
| 2008/0048521 A1* | 2/2008 | Mabuchi et al. .............. | 310/309 |
| 2008/0129785 A1* | 6/2008 | Hano et al. ..................... | 347/54 |
| 2009/0026880 A1* | 1/2009 | Liu ................................ | 310/309 |

FOREIGN PATENT DOCUMENTS

| | | |
|---|---|---|
| JP | 2005-529574 A | 9/2005 |
| WO | WO 03/105167 A2 | 12/2003 |

* cited by examiner

*Primary Examiner* — Mark Budd
(74) *Attorney, Agent, or Firm* — Ditthavong Mori & Steiner, P.C.

(57) ABSTRACT

This electrostatic actuator includes an electret film and a conductor layer formed on the electret film, and the conductor layer is so formed as to have a sectional shape reduced in width upward from the side closer to the electret film.

17 Claims, 5 Drawing Sheets

ELECTROSTATIC ACTUATOR AND POWER GENERATOR

CROSS-REFERENCE TO RELATED APPLICATIONS

The present application is a continuation application of U.S. application Ser. No. 12/194,123, which was filed on Aug. 19, 2008, and claims priority to Japanese Application No. JP2007-221041, filed on Aug. 28, 2007, the entire contents of which are herein incorporated by reference.

BACKGROUND OF THE INVENTION

1. Field of the Invention

The present invention relates to an electrostatic actuator and a power generator, and more particularly, it relates to an electrostatic actuator and a power generator each comprising an electret film.

2. Description of the Background Art

An electrostatic actuator and a power generator each comprising an electret film are known in general.

A conventional power generator (electrostatic actuator) comprises a first substrate including a conductive region having a rectangular section with angular edges and a second substrate, opposed to the first substrate, having an electret region (electret film). The conventional power generator can obtain electromotive force by changing the relative positions of the first and second substrates thereby changing the quantity of charges stored in the conductive region.

SUMMARY OF THE INVENTION

An electrostatic actuator according to a first aspect of the present invention comprises an electret film and a conductor layer formed on the electret film, and the conductor layer is so formed as to have a sectional shape reduced in width upward from the side closer to the electret film.

A power generator according to a second aspect of the present invention comprises an electret film, a conductor layer formed on the electret film and a collector opposed to the electret film and so provided as to be relatively movable with respect to the electret film, to be capable of generating power by electrostatic induction due to relative movement of the electret film and the collector, while the conductor layer is so formed as to have a sectional shape reduced in width from the side closer to the electret film toward the side closer to the collector.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

The structure of an electrostatic induction power generator 1 according to a first embodiment of the present invention is described with reference to FIGS. 1 to 3. This embodiment of the present invention is applied to the electrostatic induction power generator 1 employed as an exemplary electrostatic actuator.

Figure 1:
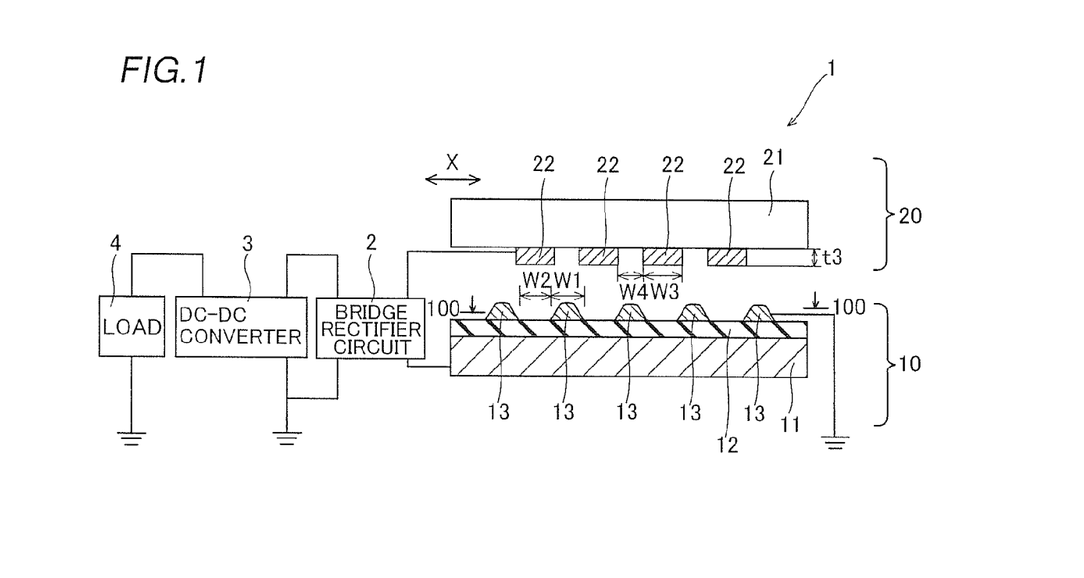
FIG. 1 is a sectional view of an electrostatic induction power generator according to a first embodiment of the present invention.

In the electrostatic induction power generator 1 according to the first embodiment, a first electrode portion 10 and a second electrode portion 20 are opposed to each other, as show in FIG. 1. The electrostatic induction power generator 1 comprises a bridge rectifier circuit 2 for rectifying generated power and a DC-DC converter 3 for converting the voltage of a direct current. A load 4 driven by the power generated by the electrostatic induction power generator 1 is connected to the DC-DC converter 3. The DC-DC converter 3 and the load 4 are grounded respectively.

As shown in FIG. 1, an electret film 12 of fluororesin such as polytetrafluoroethylene (PTFE) or silicon oxide having a thickness t1 (see FIG. 3) of about 100 µm to about 1000 µm is formed on the surface of a substrate 11 made of a conductor. The electret film 12 is controlled to a potential of about −20 V to about −2000 V by negative charges injected into the overall surface by corona discharge and entirely distributed therein.

According to the first embodiment, a guard electrode 13 is formed on the surface of the electret film 12. The guard electrode 13 is an example of the "conductor layer" in the present invention. This guard electrode 13 has a function of inhibiting an electric field resulting from the charges stored in the electret film 12 from spreading. The guard electrode 13 may be employed as a wire connecting elements formed on the electret film 12 with each other, or as a spacer or a stopper for preventing a collector 22, described later, opposed to the electret film 12 from coming into contact with the electret film 12. The guard electrode 13 is made of a conductor such as Al or W, and has a thickness of about 0.05 µm to about 1 µm.

Figure 3:
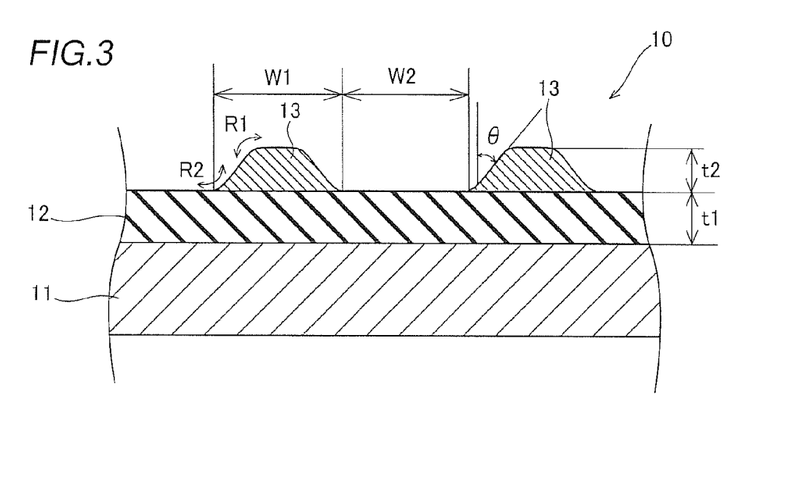
FIG. 3 is an enlarged view of a first electrode portion of the electrostatic induction power generator according to the first embodiment shown in FIG. 1.

According to the first embodiment, portions around the upper and lower ends of the guard electrode 13 are so formed as to have tapered sections reduced in width (tapered) upward from the side closer to the electret film 12, as shown in FIG. 3. The guard electrode 13 is so formed that the taper angle θ is about 20° to about 50°. According to the first embodiment, the sectional shapes of corners on the upper end portions of the guard electrode 13 are so rounded as to have a radius R1 of curvature of about 0.1 µm to about 1 µm. The side of the guard electrode 13 in contact with the electret film 12 is so concavely rounded that the width thereof is gradually increased toward the electret film 12, to have a radius R2 of curvature of about 0.1 µm to about 1 µm.

Figure 2:
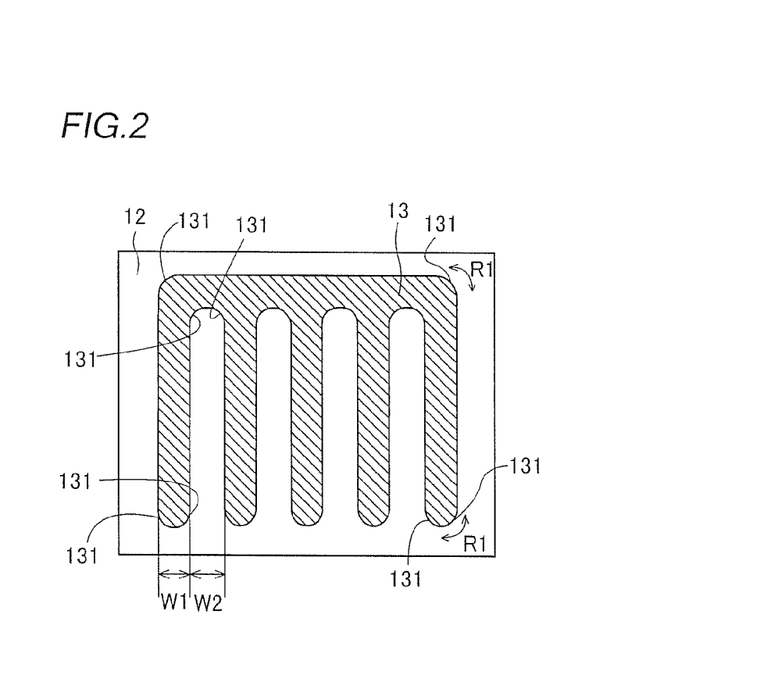
FIG. 2 is a sectional view taken along the line 100-100 in FIG. 1.

According to the first embodiment, the guard electrode 13 is interdigitally formed in plan view and corners 131 of the guard electrode 13 are so rounded as to have the radius R1 of curvature of about 0.1 µm to about 1 µm, as shown in FIG. 2. The width W1 of teeth forming the interdigital guard electrode 13 and the interval W2 between the teeth are about 100 µm to about 1000 µm respectively. The guard electrode 13 is grounded.

As sown in FIG. 1, the collector 22 of Al or W having a thickness t3 of about 0.05 µm to about 1 µm is formed on the lower surface of another substrate 21 made of insulating glass.

The collector 22 is formed interdigitally or in a stripped manner similarly to the guard electrode 13 shown in FIG. 2, and the width W3 of teeth forming the collector 22 and the interval W4 between the teeth are about 100 µm to about 1000 µm respectively. The interval W2 between the teeth forming the guard electrode 13 and the width W3 of the teeth forming the collector 22 satisfy the relation W3≧W2.

The power generating operation of the electrostatic induction power generator 1 according to the first embodiment of the present invention is now described with reference to FIG. 1.

When no vibration is applied to the electrostatic induction power generator 1, the surface of the electret film 12 and the collector 22 are opposed to each other at a prescribed interval, as shown in FIG. 1. The surface of the electret film 12 is controlled to the negative potential (about −20 V to about −2000 V), and hence the collector 22 electrostatically induces positive charges.

When horizontal vibration (along arrow X) is applied to the electrostatic induction power generator 1, the electret film 12 and the collector 22 so relatively move that the collector 22 is opposed to the guard electrode 13. Thus, the potential opposed to the collector 22 changes from the potential (about −20 V to about −2000 V) of the electret film 12 to the potential (ground potential) of the guard electrode 13, to change the quantity of the charges electrostatically induced by the collector 22. This change in the quantity of the charges forms a current, which in turn is output to the load 4 through the bridge rectifier circuit 2 and the DC-DC converter 3. Then, the electret film 12 and the collector 22 are opposed to each other again by vibration, whereby the collector 22 stores positive charges. Thus, the electrostatic induction power generator 1 continuously generates power due to repetitive relative movement of the electret film 12 and the collector 22.

According to the first embodiment, as hereinabove described, the electrostatic power generator 1 comprises the guard electrode 13 for inhibiting the electric field resulting from the charges stored in the electret film 12 from spreading and the guard electrode 13 is so formed as to have the sectional shape reduced in width upward from the side closer to the electret film 12, whereby the collector 22 and the guard electrode 13 can be inhibited from catching each other when coming into contact with each other, due to the inclined side surfaces of the guide electrode 13. Thus, the electret film 12 provided with the guard electrode 13 on the surface thereof can smoothly vibrate.

According to the first embodiment, as hereinabove described, the sectional shapes of the corners on the upper end portions of the guard electrode 13 are so rounded that the collector 22 and the guard electrode 13 can be further inhibited from catching each other when coming into contact with each other, due to the rounded end portions on the surface of the guard electrode 13.

According to the first embodiment, as hereinabove described, the side surfaces of the guard electrode 13 are so tapered upward from the side closer to the electret film 12 that the collector 22 and the guard electrode 13 can be inhibited from catching each other when coming into contact with each other, due to the tapered side surfaces of the guard electrode 13.

According to the first embodiment, as hereinabove described, the guard electrode 13 is so interdigitally formed in plan view that a portion inhibiting the electric field from spreading and a portion allowing the electric field to spread can be easily formed.

According to the first embodiment, as hereinabove described, the sectional shape on the lower end portion of the guard electrode 13 is so concavely rounded that the width thereof is gradually increased toward the electret film 12, whereby the guard electrode 13 can be stably formed with respect to the electret film 12.

Second Embodiment

Figure 4:
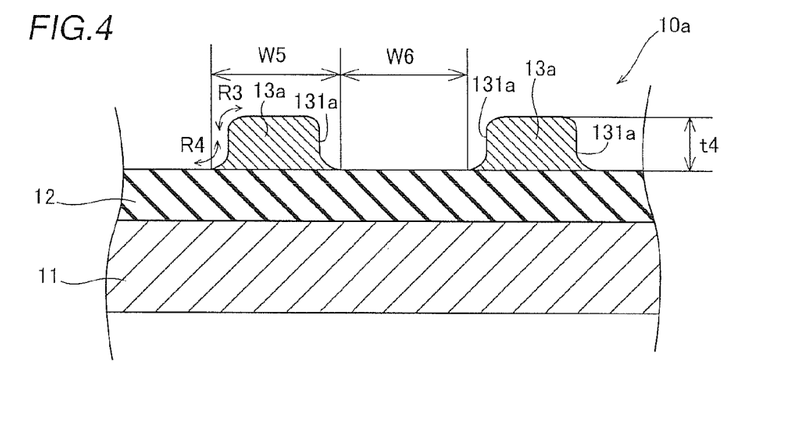
FIG. 4 is an enlarged view of a first electrode portion of an electrostatic induction power generator according to a second embodiment of the present invention.

Referring to FIG. 4, a first electrode portion 10a of an electrostatic induction power generator according to a second embodiment of the present invention is so formed that side surfaces 131a of a guard electrode 13a are perpendicular to the surface of an electret film 12, dissimilarly to the aforementioned first embodiment.

In the first electrode portion 10a of the electrostatic induction power generator according to the second embodiment, the guard electrode 13a for inhibiting an electric field resulting from charges stored in the electret film 12 from spreading is formed on the surface of the electret film 12, as shown in FIG. 4. The guard electrode 13a is an example of the "conductor layer" in the present invention. The guard electrode 13a has a thickness t4 of about 0.05 µm to about 1 µm. The guard electrode 13a has a sectional shape reduced in width from the side in contact with the electret film 12 toward a side not in contact with the electret film 12, and is so formed that the side surfaces 131a thereof are perpendicular to the surface of the electret film 12. According to the second embodiment, sectional shapes on ends of the surface of the guard electrode 13a are so rounded as to have a radius R3 of curvature of about 0.1 µm to about 1 µm. The side of the guard electrode 13a in contact with the electret film 12 is gradually increased in width toward the electret film 12, to have a radius R4 of curvature of about 0.1 µm to about 1 µm.

The guard electrode 13a is interdigitally formed in plan view as shown in FIG. 2, similarly to the guard electrode 13 of the electrostatic induction power generator 1 according to the aforementioned first embodiment. The width W5 of teeth forming the guard electrode 13a and the interval W6 between the teeth are about 100 µm to about 1000 µm respectively. The guard electrode 13a is grounded.

The remaining structure of the electrostatic induction power generator according to the second embodiment is identical to that of the electrostatic induction power generator 1 according to the aforementioned first embodiment.

According to the second embodiment, as hereinabove described, the ends of the surface of the guard electrode 13a on the side not in contact with the electret film 12 are so rounded that a collector 22 (see FIG. 1) and the guard electrode 13a can be inhibited from catching each other when coming into contact with each other, due to the rounded sectional shapes of the ends of the surface of the guard electrode 13a.

According to the second embodiment, as hereinabove described, the side surfaces 131a of the guard electrode 13a are so formed as to have sectional shapes substantially perpendicular to the surface of the electret film 12 so that an electric field formed between the guard electrode 13a and the electret film 12 spreads along the perpendicular side surfaces 131a of the guard electrode 13a, thereby spreading perpendicularly to the surfaces of the guard electrode 13a and the electret film 12. Thus, stable electric induction takes place between the guard electrode 13a and the electret film 12, whereby the electrostatic induction power generator can stably generate power.

Third Embodiment

Figure 5:
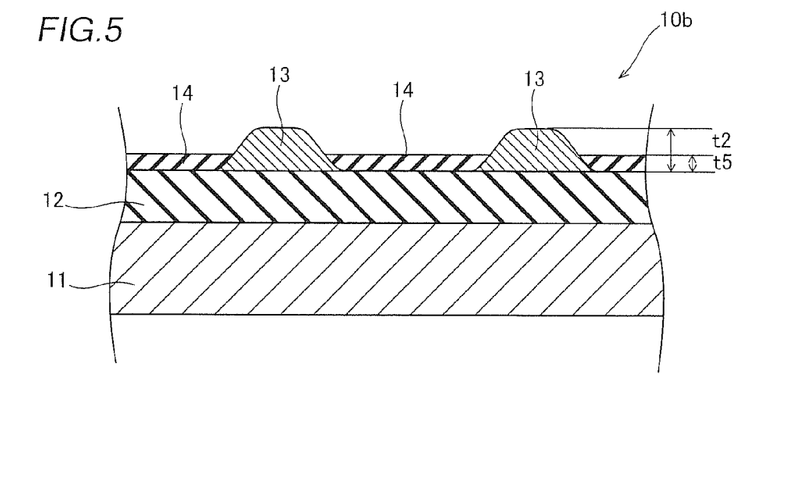
FIG. 5 is an enlarged view of a first electrode portion of an electrostatic induction power generator according to a third embodiment of the present invention.

Referring to FIG. 5, a first insulating film 14 is formed on a surface of an electret film 12 not provided with a guard electrode 13 in a first electrode portion 10b of an electrostatic induction power generator according to a third embodiment of the present invention, dissimilarly to the aforementioned first embodiment.

In the first electrode portion 10b of the electrostatic induction power generator according to the third embodiment, the first insulating film 14 consisting of at least any one of an MSQ (methyl silsesquioxane) film, an SiOC film and an SiN film is formed on the surface of the electret film 12 not provided with the guard electrode 13, as shown in FIG. 5. The first insulating film 14 has a function of inhibiting charges from flowing out of the surface of the electret film 12. The first insulating film 14 has a thickness t5 of about 0.01 µm to about 1 µm, which is identical to or smaller than the thickness t2 of the guard electrode 13.

The remaining structure of the electrostatic induction power generator according to the third embodiment is identical to that of the electrostatic induction power generator 1 according to the aforementioned first embodiment.

According to the third embodiment, as hereinabove described, the first insulating film 14 is so formed on the surface of the electret film 12 not provided with the guard electrode 13 as to inhibit the charges from flowing out of the surface of the electret film 12 not provided with the guard electrode 13, whereby the surface potential of the electret film 12 can be prevented from reduction.

According to the third embodiment, as hereinabove described, the first insulating film 14 is so made of a material capable of inhibiting the charges from flowing out of the electret film, whereby the surface potential of the electret film 12 can be prevented from reduction.

According to the third embodiment, as hereinabove described, the first insulating film 14 is so formed by at least any one of an MSQ film, an SiOC film and an SiN film that the charges can be inhibited from flowing out of the surface of the electret film 12.

The remaining effects of the third embodiment are similar to those of the aforementioned first embodiment.

Fourth Embodiment

Figure 6:
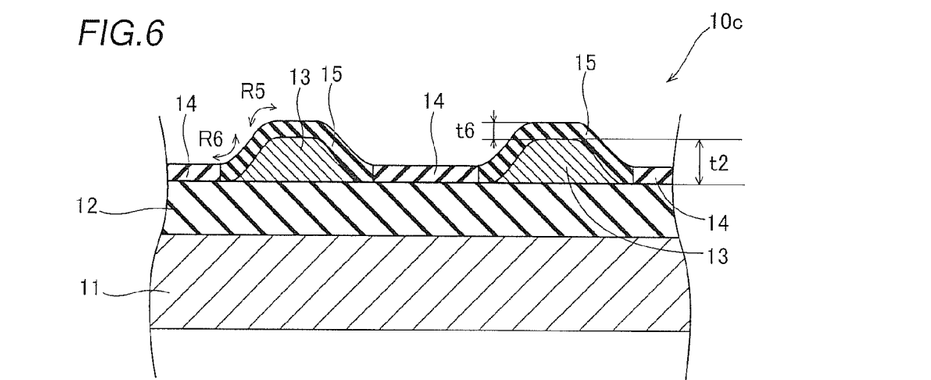
FIG. 6 is an enlarged view of a first electrode portion of an electrostatic induction power generator according to a fourth embodiment of the present invention.

Referring to FIG. 6, a protective film 15 is formed on the surface of a guard electrode 13 in a first electrode portion 10c of an electrostatic induction power generator according to a fourth embodiment of the present invention, dissimilarly to the aforementioned third embodiment.

In the first electrode portion 10c of the electrostatic induction power generator according to the fourth embodiment, the protective film 15 is formed on the surface of the guard electrode 13, as shown in FIG. 6. The protective film 15 may be an insulating film formed by at least any one of an MSQ film, an SiOC film and an SiN film, or may be a conductive film. The protective film 15 is so formed as to have a thickness t6 of about 0.01 µm to about 1 µm, which is identical to or smaller than the thickness t2 of the guard electrode 13. Sectional shapes on end portions of the surface of the protective film 15 are so rounded as to have a radius R5 of curvature of about 0.1 µm to about 1 µm. Further, the protective film 15 is so formed that the width thereof is gradually increased toward the electret film 12, to have a radius R6 of curvature of about 0.1 µm to about 1 µm. The radii R5 and R6 of curvature are identical to or larger than the radii R1 and R2 (see FIG. 3) of curvature of the guard electrode 13. Thus, a collector 22 and the guard electrode 13 more hardly catch each other as compared with a case where no protective film 15 is formed, whereby the electret film 12 can more smoothly vibrate.

The remaining structure of the electrostatic induction power generator according to the fourth embodiment is identical to that of the electrostatic induction power generator 1 according to the aforementioned first embodiment.

According to the fourth embodiment, as hereinabove described, the protective film 15 is so formed on the surface of the guard electrode 13 as to prevent the guard electrode 13 and the collector 22 from coming into contact with each other, whereby charges stored in the collector 22 can be inhibited from flowing out toward the guard electrode 13.

According to the fourth embodiment, as hereinabove described, the protective film 15 is formed by at least any one of an MSQ film, an SiOC film and an SiN film, thereby preventing the guard electrode 13 and the collector 22 from coming into contact with each other.

The remaining effects of the fourth embodiment are similar to those of the aforementioned first embodiment.

Fifth Embodiment

Figure 7:
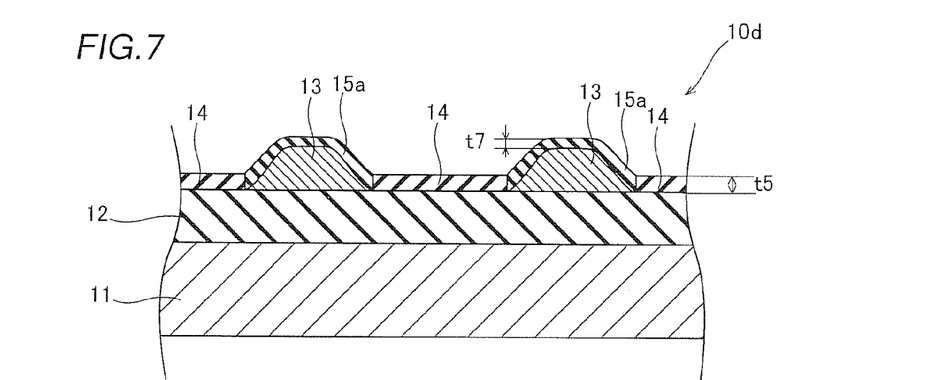
FIG. 7 is an enlarged view of a first electrode portion of an electrostatic induction power generator according to a fifth embodiment of the present invention.

Referring to FIG. 7, a first insulating film 14 has a thickness t5 larger than the thickness t7 of a protective film 15a in a first electrode portion 10d of an electrostatic induction power generator according to a fifth embodiment of the present invention, dissimilarly to the aforementioned fourth embodiment.

In the first electrode portion 10d of the electrostatic induction power generator according to the fifth embodiment, the protective film 15a consisting of at least any one of an MSQ film, an SiOC film and an SiN film is formed on the surface of a guard electrode 13, as shown in FIG. 7. According to the fifth embodiment, the first insulating film 14 is so formed that the thickness t5 thereof is larger than the thickness t7 of the protective film 15a.

The remaining structure of the electrostatic induction power generator according to the fifth embodiment is identical to that of the electrostatic induction power generator according to the aforementioned fourth embodiment.

According to the fifth embodiment, as hereinabove described, the first insulating film 14 is so formed that the thickness t5 thereof is larger than the thickness t7 of the protective film 15*a*, whereby the first insulating film 14 can be prevented from damage exposing the electret film 12 even if the protective film 15*a* is damaged to expose the guard electrode 13, due to the thickness t5 of the first insulating film 14 larger than the thickness t7 of the protective film 15*a*. Thus, the surface potential of the electret film 12 can be prevented from reduction resulting from such damage.

The remaining effects of the third embodiment are similar to those of the aforementioned fourth embodiment.

Sixth Embodiment

Figure 8:
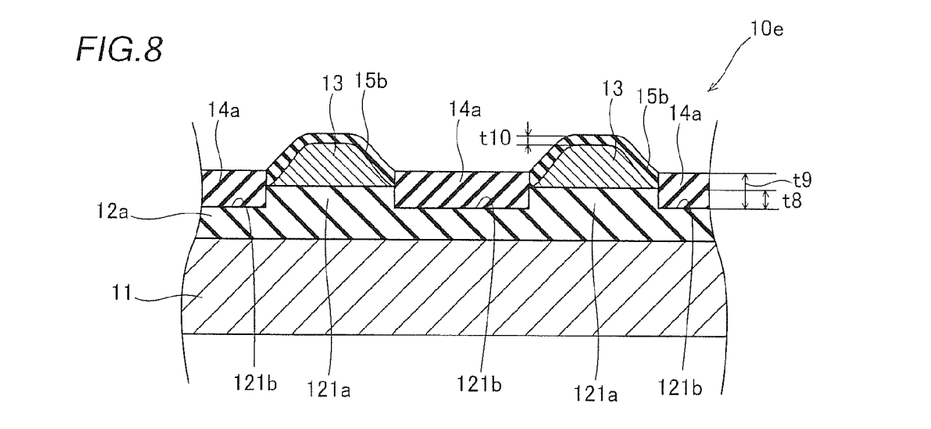
FIG. 8 is an enlarged view of a first electrode portion of an electrostatic induction power generator according to a sixth embodiment of the present invention.

Referring to FIG. 8, an electret film 12*a* is provided with projecting portions 121*a* in a first electrode portion 10*e* of an electrostatic induction power generator according to a sixth embodiment of the present invention, dissimilarly to the electrostatic induction power generator according to the aforementioned fifth embodiment.

As shown in FIG. 8, the electret film 12*a* having the projecting portions 121*a* is formed on the surface of a substrate 11 in the first electrode portion 10*e* of the electrostatic induction power generator according to the sixth embodiment, as shown in FIG. 8. The projecting portions 121*a* are interdigitally formed in plan view, in response to the shape of a guard electrode 13. The projecting portions 121*a* have a thickness t8 of about 0.64 μm. The guard electrode 13 is formed on the surfaces of the projecting portions 121*a* of the electret film 12*a*. Thus, charges stored in the surfaces of recess portions 121*b* of the electret film 12*a* can be inhibited from flowing out toward the guard electrode 13. Further, a first insulating film 14*a* consisting of at least any one of an MSQ film, an SiOC film and an SiN film and having a thickness of about 1.55 μm is formed on the surfaces of the recess portions 121*b* of the electret film 12*a*. Thus, the charges stored in the surfaces of the recess portions 121*b* of the electret film 12*a* can be further inhibited from flowing out. A protective film 15*b* consisting of an MSQ film, an SiOC film and an SiN film and having a thickness t10 of about 0.28 μm is formed on the surface of the guard electrode 13. The thickness t8 of the projecting portions 121*a* of the electret film 12*a*, the thickness t9 of the first insulating film 14*a* and the thickness t10 of the protective film 15*b* are in ratios of about 2.2:5.5:1.0.

The remaining structure of the electrostatic induction power generator according to the sixth embodiment is identical to that of the electrostatic induction power generator according to the aforementioned fifth embodiment.

According to the sixth embodiment, as hereinabove described, the guard electrode 13 is so formed on the surfaces of the projecting portions 121*a* that the charges stored in the surfaces of the recess portions 121*b* of the electret film 12*a* can be inhibited from flowing out toward the guard electrode 13.

According to the sixth embodiment, as hereinabove described, the first insulating film 14*a* is so formed on the surfaces of the recess portions 121*b* that the charges stored in the surfaces of the recess portions 121*b* of the electret film 12*a* can be further inhibited from flowing out.

The remaining effects of the sixth embodiment are similar to those of the aforementioned fifth embodiment.

Seventh Embodiment

Figure 9:
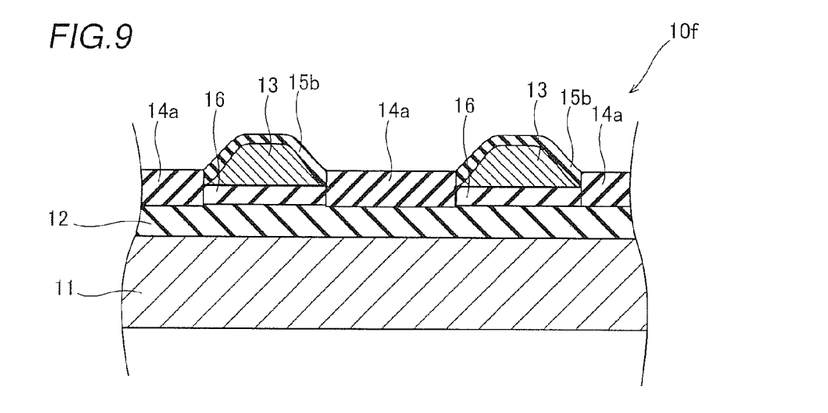
FIG. 9 is an enlarged view of a first electrode portion of an electrostatic induction power generator according to a seventh embodiment of the present invention.

Referring to FIG. 9, a second insulating film 16 is formed on the surface of an electret film 12 in a first electrode portion 10*f* of an electrostatic induction power generator according to a seventh embodiment of the present invention, dissimilarly to the aforementioned sixth embodiment.

In the first electrode portion 10*f* of the electrostatic induction power generator according to the seventh embodiment, the second insulating film 16 consisting of an HDP (high density plasma) oxide film is formed on the surface of the electret film 12, as shown in FIG. 9. The second insulating film 16 is interdigitally formed in plan view, in response to the shape of a guard electrode 13. The guard electrode 13 is formed on the surface of the second insulating film 16. The second insulating film 16 can inhibit charges stored in a surface of the electret film 12 not provided with the second insulating film 16 from flowing out toward the guard electrode 13. A first insulating film 14*a* consisting of at least any one of an MSQ film, an SiOC film and an SiN film is formed on the surface of the electret film 12 not provided with the second insulating film 16. Thus, the charges stored in the surface of the electret film 12 not provided with the second insulating film 16 can be further inhibited from flowing out. A protective film 15*b* consisting of at least any one of an MSQ film, an SiOC film and an SiN film is formed on the surface of the guard electrode 13.

The remaining structure of the electrostatic induction power generator according to the seventh embodiment is identical to that of the electrostatic induction power generator according to the aforementioned sixth embodiment.

According to the seventh embodiment, as hereinabove described, the second insulating film 16 is so formed between the electret film 12 and the guard electrode 13 that the charges stored in the surface of the electret film 12 not provided with the second insulating film 16 can be inhibited from flowing out toward the guard electrode 13.

The remaining effects of the seventh embodiment are similar to those of the aforementioned sixth embodiment.

Eighth Embodiment

Figure 10:
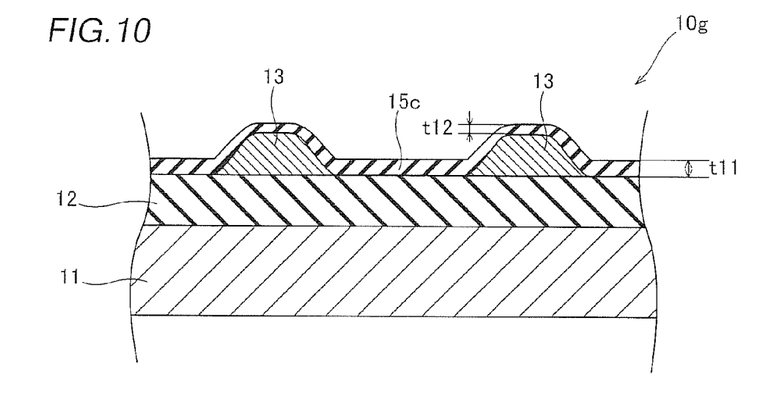
FIG. 10 is an enlarged view of a first electrode portion of an electrostatic induction power generator according to an eighth embodiment of the present invention.

Referring to FIG. 10, an insulating film and a protective film 15*c* are integrally formed by the same material in a first electrode portion 10*g* of an electrostatic induction power generator according to an eighth embodiment of the present invention, dissimilarly to the aforementioned fifth embodiment.

In the first electrode portion 10*g* of the electrostatic induction power generator according to the eighth embodiment, the protective film 15*c* consisting of at least any one of an MSQ film, an SiOC film and an SiN film is formed on a surface of an electret film 12 not provided with a guard electrode 13 and on the surface of the guard electrode 13, as shown in FIG. 10. The protective film 15*c* formed on the surface of the electret film 12 not provided with the guard electrode 13 functions as the insulating film inhibiting charges from flowing out of the surface of the electret film 12. Thus, the insulating film and the protective film 15*c* can be integrally formed by the same material at the same time dissimilarly to a case of forming the insulating film inhibiting the charges from flowing out of the surface of the electret film 12 and the protective film 15*c* through separate steps, whereby the steps of manufacturing the electrostatic induction power generator can be simplified. Further, the thickness t11 of the portion of the protective film 15*c* formed on the surface of the electret film 12 not provided with the guard electrode 13 can be easily rendered larger than the thickness t12 of the portion of the protective film 15*c* formed on the surface of the guard electrode 13 by employing spin coating.

The remaining structure of the electrostatic induction power generator according to the eighth embodiment is identical to that of the electrostatic induction power generator according to the aforementioned fifth embodiment.

According to the eighth embodiment, as hereinabove described, the insulating film formed on the surface of the electret film 12 not provided with the guard electrode 13 and the protective film 15c formed on the surface of the guard electrode 13 are integrally formed by the same material on the surface of the electret film 12 so that the insulating film and the protective film 15c can be integrally formed by the same material dissimilarly to the case of forming the insulating film and the protective film 15c through separate steps, whereby the structure of the electrostatic induction power generator can be simplified.

The remaining effects of the eighth embodiment are similar to those of the aforementioned fifth embodiment.

Ninth Embodiment

Figure 11:
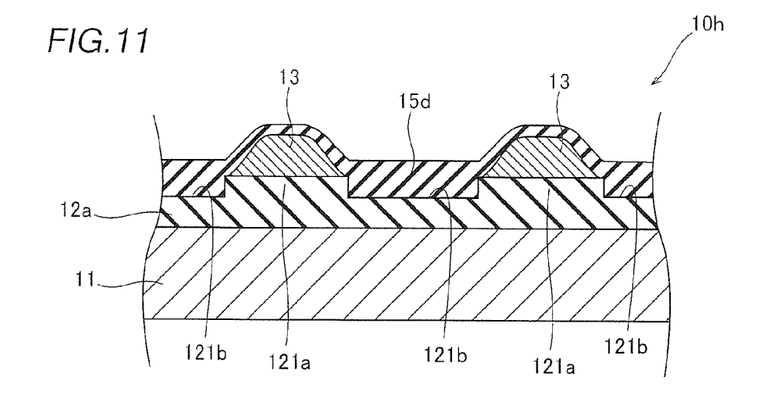
FIG. 11 is an enlarged view of a first electrode portion of an electrostatic induction power generator according to a ninth embodiment of the present invention.

Referring to FIG. 11, insulating films and a protective film 15d are integrally formed by the same material in a first electrode portion 10h of an electrostatic induction power generator according to a ninth embodiment of the present invention, dissimilarly to the aforementioned sixth embodiment.

In the first electrode portion 10h of the electrostatic induction power generator according to the ninth embodiment, the protective film 15d consisting of at least any one of an MSQ film, an SiOC film and an SiN film is so formed as to cover the side surfaces of projecting portions 121a of an electret film 12a, the surfaces of recess portions 121b and the surface of a guard electrode 13, as shown in FIG. 11. The portions of the protective film 15d formed on the surfaces of the recess portions 121b of the electret film 12a function as the insulating films inhibiting charges from flowing out of the surface of the electret film 12a.

The remaining structure of the electrostatic induction power generator according to the ninth embodiment is identical to that of the electrostatic induction power generator according to the aforementioned sixth embodiment.

According to the ninth embodiment, as hereinabove described, the insulating films formed on the recess portions 121b and the protective film 15d formed on the surface of the guard electrode 13 are integrally formed by the same material on the surface of the electret film 12 so that the insulating films and the protective film 15d can be integrally formed by the same material dissimilarly to a case of forming the insulating films and the protective film 15d through separate steps, whereby the structure of the electrostatic induction power generator can be simplified.

The remaining effects of the ninth embodiment are similar to those of the aforementioned sixth embodiment.

Tenth Embodiment

Figure 12:
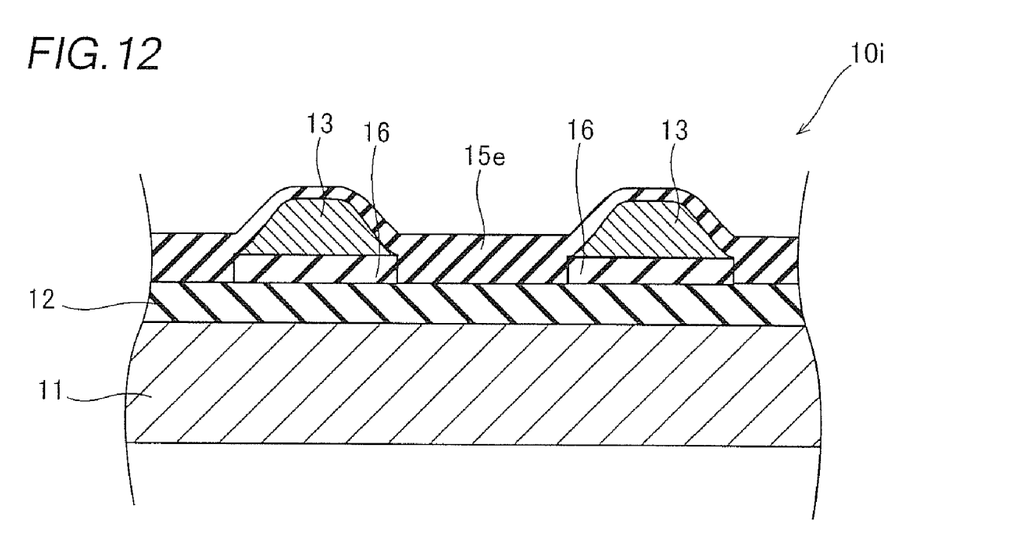
FIG. 12 is an enlarged view of a first electrode portion of an electrostatic induction power generator according to a tenth embodiment of the present invention.

Referring to FIG. 12, an insulating film and a protective film 15e are integrally formed in a first electrode portion 10i of an electrostatic power generator according to a tenth embodiment of the present invention, dissimilarly to the aforementioned seventh embodiment.

In the first electrode portion 10i of the electrostatic power generator according to the tenth embodiment, a second insulating film 16 is formed on the surface of an electret film 12, as shown in FIG. 12. The protective film 15e consisting of at least any one of an MSQ film, an SiOC film and an SiN film is so formed as to cover surface portions of the electret film 12 not provided with a guard electrode 13, the side surfaces of the second insulating film 16 and the surface of the guard electrode 13. The protective film 15e formed on the surface portions of the electret film 12 not provided with the guard electrode 13 functions as the insulating film inhibiting charges from flowing out of the surface of the electret film 12.

The remaining structure of the electrostatic induction power generator according to the tenth embodiment is similar to that of the electrostatic induction power generator according to the aforementioned seventh embodiment.

Further, the remaining effects of the electrostatic induction power generator according to the tenth embodiment are also similar to those of the electrostatic induction power generator according to the aforementioned seventh embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while each of the aforementioned first to tenth embodiments is applied to the electrostatic induction power generator employed as an exemplary electrostatic actuator, the present invention is not restricted to this but is also applicable to another electrostatic actuator such as an electrostatic induction actuator or an electrostatic induction sensor, so far as the same includes an electret film.

While the substrate 11 made of a conductor is employed in each of the aforementioned first to tenth embodiments, the present invention is not restricted to this but a substrate made of an insulator may alternatively be employed. In this case, however, a conductor layer must be formed between the substrate made of an insulator and the electret film 12 or 12a.

While the guard electrode 13 or 13a is grounded in each of the aforementioned first to tenth embodiments, the present invention is not restricted to this but the guard electrode 13 or 13a may alternatively be not grounded. Further, a prescribed voltage reverse in polarity to the surface potential of the electret film 12 or 12a may be applied to the guard electrode 13 or 13a.

While the interval W4 between the teeth forming the collector 22 is larger than the interval W2 between the teeth forming the interdigital guard electrode 13 or 13a in each of the aforementioned first to tenth embodiments, the present invention is not restricted to this but the width W1 of the teeth forming the guard electrode 13 or 13a may alternatively be rendered larger than the width W3 of the teeth forming the collector 22.

While the thickness t3 of the collector 22 is substantially identical to the thickness t2 of the guard electrode 13 or 13a in each of the aforementioned first to tenth embodiments, the present invention is not restricted to this but the thickness t2 of the guard electrode 13 or 13a may alternatively be rendered larger than the thickness t3 of the collector 22.

What is claimed is:
1. An electrostatic actuator comprising:
a substrate;
an electret film, into which negative charges are injected, formed on a surface of said substrate; and
a guard electrode, which has a function of inhibiting an electric field resulting from the charges stored in said electret film from spreading, consists of a conductor layer formed on the surface of said electret film on a side opposite to said substrate so as to expose the surface, wherein said guard electrode which consists of said conductor layer is so formed as to have a sectional shape reduced in width upward from the side closer to said electret film.

2. The electrostatic actuator according to claim 1, wherein portions around the upper and lower ends of said conductor layer are so formed as to have sectional shapes reduced in width upward from the side closer to said electret film, and the side surface of said conductor layer is so formed as to have a sectional shape substantially perpendicular to the surface of said electret film.

3. The electrostatic actuator according to claim 1, wherein a corner of said conductor layer is rounded in plan view.

4. The electrostatic actuator according to claim 1, wherein said conductor layer is interdigitally formed in plan view.

5. The electrostatic actuator according to claim 1, wherein a first insulating film is formed on a surface of said electret film not provided with said conductor layer.

6. The electrostatic actuator according to claim 5, wherein said first insulating film is made of a material capable of inhibiting charges from flowing out of said electret film.

7. The electrostatic actuator according to claim 6, wherein said first insulating film is formed by at least any one of an MSQ film, an SiOC film and an SiN film.

8. The electrostatic actuator according to claim 1, wherein a protective film is formed on the surface of said conductor layer.

9. The electrostatic actuator according to claim 8, wherein said protective film is formed by at least any one of an MSQ film, an SiOC film and an SiN film.

10. The electrostatic actuator according to claim 9, wherein a first insulating film is formed on a surface of said electret film not provided with said conductor layer, and the thickness of said first insulating film is larger than the thickness of said protective film.

11. The electrostatic actuator according to claim 1, wherein a first insulating film formed on a surface of said electret film not provided with said conductor layer and a protective film formed on the surface of said conductor layer are integrally formed on said surface of said electret film by the same material.

12. The electrostatic actuator according to claim 1, wherein said electret film includes a projecting portion, and said conductor layer is formed on the surface of said projecting portion.

13. The electrostatic actuator according to claim 5, wherein a recess portion is formed on said surface of said electret film not provided with said conductor layer, and said first insulating film is formed on the surface of said recess portion.

14. The electrostatic actuator according to claim 13, wherein said first insulating film formed on said recess portion and a protective film formed on the surface of said conductor layer are integrally formed on said surface of said electret film by the same material.

15. The electrostatic actuator according to claim 1, wherein an interlayer insulating film is formed between said electret film and said conductor layer.

16. The electrostatic actuator according to claim 1, wherein the sectional shape on the lower end portion of said conductor layer is concavely rounded so that the width is increased toward said electret film.

17. A power generator comprising:

a substrate;

an electret film, into which negative charges are injected, formed on a surface of said substrate;

a guard electrode, which has a function of inhibiting an electric field resulting from the charges stored in said electrets film from spreading, consists of a conductor layer formed on the surface of said electret film on a side opposite to said substrate so as to expose the surface; and a collector opposed to said electret film and so provided as to be relatively movable with respect to said electret film, to be capable of generating power by electrostatic induction due to relative movement of said electret film and said collector, wherein said guard electrode which consists of said conductor layer is so formed as to have a sectional shape reduced in width from the side closer to said electret film toward the side closer to said collector.

* * * * *